(12) United States Patent
Ginzburg et al.

(10) Patent No.: US 12,360,204 B2
(45) Date of Patent: Jul. 15, 2025

(54) SYSTEM AND METHOD FOR DECEPTION AND CLOAKING OF DETECTION SYSTEM

(71) Applicant: Ramot at Tel-Aviv University Ltd., Tel-Aviv (IL)

(72) Inventors: Pavel Ginzburg, Tel-Aviv (IL); Vitali Kozlov, Tel-Aviv (IL); Dmytro Vovchuk, Tel-Aviv (IL)

(73) Assignee: Ramot at Tel-Aviv University Ltd., Tel-Aviv (IL)

( * ) Notice: Subject to any disclaimer, the term of this patent is extended or adjusted under 35 U.S.C. 154(b) by 365 days.

(21) Appl. No.: 17/918,340

(22) PCT Filed: Apr. 16, 2021

(86) PCT No.: PCT/IL2021/050434
§ 371 (c)(1),
(2) Date: Oct. 12, 2022

(87) PCT Pub. No.: WO2021/210004
PCT Pub. Date: Oct. 21, 2021

(65) Prior Publication Data
US 2023/0204716 A1 Jun. 29, 2023

(30) Foreign Application Priority Data
Apr. 16, 2020 (IL) .......................................... 273995

(51) Int. Cl.
*G01S 7/38* (2006.01)
*G01S 7/02* (2006.01)
(Continued)

(52) U.S. Cl.
CPC ................ *G01S 7/38* (2013.01); *G01S 7/021* (2013.01); *H01Q 15/002* (2013.01); *H01Q 15/148* (2013.01)

(58) Field of Classification Search
CPC ......... G01S 7/38; G01S 7/021; H01Q 15/002; H01Q 15/148
See application file for complete search history.

(56) References Cited

U.S. PATENT DOCUMENTS 8,680,945 B1 * 3/2014 Wang ........................ H01P 1/18
333/139
9,588,255 B1 * 3/2017 Tassin ................ G02B 6/29373
(Continued)

FOREIGN PATENT DOCUMENTS

CN 110829033 2/2020
CN 110829033 A * 2/2020 ......... H01Q 15/0086
(Continued)

OTHER PUBLICATIONS

CN110829033Atranslation.pdf, machine translation of CN110829033Atranslation.pdf (Year: 2020).*
(Continued)

*Primary Examiner* — William Kelleher
*Assistant Examiner* — Kenneth W Good

(57) ABSTRACT

A cloaking and/or deception system comprises: a structure having a plurality of resonators characterized by a controllable resonance frequency, wherein the resonators are arranged to collectively ensure that variation of the resonance frequency over a predetermined range of resonance frequencies generates a phase shift between the an electromagnetic wave incident on the structure and an electromagnetic wave scattered off the structure; and a controller configured for controlling the resonance frequency to provide a time-varying resonance frequency characterized by a temporal function which comprises a linear time-dependence.

17 Claims, 8 Drawing Sheets

(51) Int. Cl.
*H01Q 15/00* (2006.01)
*H01Q 15/14* (2006.01)

(56) References Cited

U.S. PATENT DOCUMENTS

| | | | | |
|---|---|---|---|---|
| 2010/0225562 | A1* | 9/2010 | Smith | H01Q 15/02 702/179 |
| 2012/0045984 | A1* | 2/2012 | Cornwell | H04K 3/43 455/1 |
| 2015/0015275 | A1* | 1/2015 | Huang | G01M 5/0033 324/633 |
| 2016/0087342 | A1 | 3/2016 | Alu | |
| 2017/0047663 | A1 | 2/2017 | Hall | |
| 2017/0131334 | A1* | 5/2017 | Ramzan | G01N 22/00 |
| 2017/0235162 | A1 | 8/2017 | Shaltout et al. | |
| 2019/0067806 | A1* | 2/2019 | Xu | H01Q 1/422 |
| 2019/0146082 | A1* | 5/2019 | Cohen | H01Q 1/2225 342/70 |
| 2019/0392275 | A1 | 12/2019 | Filonov | |
| 2021/0270916 | A1* | 9/2021 | Szalai | G01R 33/60 |
| 2021/0384890 | A1* | 12/2021 | Schmidhammer | H03H 7/38 |

FOREIGN PATENT DOCUMENTS

| | | | |
|---|---|---|---|
| UA | 107833 C2 * | 2/2015 | |
| WO | WO-2018119153 A2 * | 6/2018 | H01L 23/4855 |
| WO | WO 2021/210004 | 10/2021 | |

OTHER PUBLICATIONS

17918340_2024-12-04_UA_107833_C2_M.pdf, machine translation of UA 107833 C2 (Year: 2015).*
Alitalo et al. "Electromagnetic Cloaking With Metamaterials", Materials Today, 12(3): 22-29, Mar. 2009.
Fleury et al. "Cloaking And Invisibility: A Review", Progress In Electromagnetics Research, 147: 171-202, Jan. 2014.
Schurig et al. "Metamaterial Electromagnetic Cloak at Microwave Frequencies", Science, 314(5801): 977-980, Nov. 10, 2006.
International Search Report and the Written Opinion Dated Aug. 9, 2021 From the International Searching Authority Re. Application No. PCT/IL2021/050434. (10 Pages).
Alù et al. "Achieving Transparency With Plasmonic and Metamaterial Coatings", 72(1): 1-9, Jul. 26, 2005.
Bahret et al. "The Beginnings of Stealth Technology", IEEE Transactions on Aerospace and Electronic Systems, 29(4):1377-1385, Oct. 1993.
Chambers et al. "The Phase-Switched Screen," IEEE Antennas and Propagation Magazine, 46(6): 23-37, Dec. 2004.
Chen et al. "Micro-Doppler Effect in Radar: Phenomenon, Model, and Simulation Study," IEEE Transactions on Aerospace and Electronic Systems, 42(1): 2-21, Jan. 2006.
Chen et al. "On Broadband Active Cloaking", 2019 IEEE International Symposium on Antennas and Propagation and USNC-URSI Radio Science Meeting, Atlanta, GA, USA, Jul. 7-12, 2019, p. 1317-1318, Jul. 7, 2019.
Choudhury et al. "A Review of Metamaterial Invisibility Cloaks", 1-16.
Cloutier et al. "A New Clutter Rejection Algorithm for Doppler Ultrasound," IEEE Transactions on Medical Imaging, 22(4): 530-538, Apr. 2003.
Dawidowicz et al. "DPCA Detection of Moving Targets in Airborne Passive Radar," IEEE Transactions on Aerospace and Electronic Systems, 48(2): 1347-1357, Apr. 2012.
DiFranco et al. "Radar Performance Review in Clear and Jamming Environments," IEEE Transactions on Aerospace and Electronic Systems, AES-17(5): 701-710, Sep. 1981.
Friedman "Jamming Susceptibility", IEEE Transactions on Aerospace and Electronic Systems, AES-4(4): 515-528, Jul. 1968.
Grant et al. "Introduction to Electronic Warfare", IEEE Proceedings F (Communications, Radar and Signal Processing), 129(3): 113-132, Jun. 1982.

Hyun et al. "Two-Step Moving Target Detection Algorithm for Automotive 77 GHz FMCW Radar", 2010 IEEE 72nd Vehicular Technology Conference—Fall, Ottawa, ON, Canada, Sep. 6-9, 2010, p. 1-5, Sep. 6, 2010.
Kozlov et al. "Asymmetric Backscattering from the Hybrid Magneto-Electric Meta Particle", Applied Physics Letters, 109: 203503-1-203503-6, Nov. 18, 2016.
Kozlov et al. "Coupled Micro-Doppler Signatures of Closely Located Targets", Physical Review B 100(21): 214308-1-214308-6, Dec. 1, 2019.
Kozlov et al. "Micro-Doppler Frequency Comb Generation by Rotating Wire Scatterers", Journal of Quantitative Spectroscopy and Radiative Transfer, 190: 7-12, Mar. 2017.
Kvernsveen "An Adaptive MTI Filter for Coherent Radar. A Real-Time Algorithm for Attenuation of Both Stationary and Non-Stationary Radar Clutter," 1996 IEEE Digital Signal Processing Workshop Proceedings, Loen, Norway, Sep. 1-4, 1996, 351-353, Sep. 1, 1996.
Leonhardt "Optical Conformal Mapping", Science 312(5781): 1777-1780, Jun. 23, 2006.
Liu et al. "Design and Experimental Demonstration of Doppler Cloak from Spatiotemporally Modulated Metamaterials Based on Rotational Doppler Effect", Optics Express 28(3): 3745-3755, Jan. 27, 2020.
Long "Non-Foster Circuit Loaded Periodic Structures for Broadband Fast and Slow Wave Propagation", A Dissertation Submitted in Partial Satisfaction of the Requirements for the Degree Doctor of Philosophy in Electrical Engineering (Electronic Circuits and Systems), University of California, San Diego, CA, USA, p. 1-130, 2015.
Pendry et al. "Controlling Electromagnetic Fields", Science, 312(5781): 1780-1782, Jun. 23, 2006.
Ra'di et al. "Total Absorption of Electromagnetic Waves in Ultimately Thin Layers," IEEE Transactions on Antennas and Propagation, 61(9): 4606-4614, Sep. 2013.
Ramaccia et al. "Doppler Cloak Restores Invisibility to Objects in Relativistic Motion", Physical Review B, 95(7): 1-6, Feb. 15, 2017.
Ramaccia et al. "Phase-Induced Frequency Conversion and Doppler Effect With Time-Modulated Metasurfaces," IEEE Transactions on Antennas and Propagation, 68(3): 1607-1617, Mar. 2020.
Richards et al. "Principles of Modern Radar: Basic Principles", I: 1-1124, 2010. (Part 1).
Richards et al. "Principles of Modern Radar: Basic Principles", I: 1-1124, 2010. (Part 2).
Richards et al. "Principles of Modern Radar: Basic Principles", I: 1-1124, 2010. (Part 3).
Richards et al. "Principles of Modern Radar: Basic Principles", I: 1-1124, 2010. (Part 4).
Richards et al. "Principles of Modern Radar: Basic Principles", I: 1-1124, 2010. (Part 5).
Richards et al. "Principles of Modern Radar: Basic Principles", 1: 1-1124, 2010. (Part 6).
Richards et al. "Principles of Modern Radar: Basic Principles", I: 1-1124, 2010. (Part 7).
Richards et al. "Principles of Modern Radar: Basic Principles", I: 1-1124, 2010. (Part 8).
Richards et al. "Principles of Modern Radar: Basic Principles", I: 1-1124, 2010. (Part 9).
Richards et al. "Principles of Modern Radar: Basic Principles", I: 1-1124, 2010. (Part 10).
Richards et al. "Principles of Modern Radar: Basic Principles", I: 1-1124, 2010. (Part 11).
Richards et al. "Principles of Modern Radar: Basic Principles", I: 1-1124, 2010. (Part 12).
Richards et al. "Principles of Modern Radar: Basic Principles", I: 1-1124, 2010. (Part 13).
Richards et al. "Principles of Modern Radar: Basic Principles", I: 1-1124, 2010. (Part 14).
Smith et al. "Metamaterials and Negative Refractive Index", Science, 305(5685): 788-792, Aug. 6, 2004.

(56) References Cited

OTHER PUBLICATIONS

Wang et al. "An Elegant Solution: An Alternative Ultra-Wideband Transceiver Based on Stepped-Frequency Continuous-Wave Operation and Compressive Sensing", IEEE Microwave Magazine, 17(7): 53-63, Jul. 2016.
Supplementary European Search Report and the European Search Opinion Dated Aug. 11, 2023 From the European Patent Office Re. Application No. 21788057.4. (11 Pages).
Liu et al. "Time-varying Metasurfaces for Broadband Spectral Camouflage", Physical Review Applied 12(5): 054052, 8 pages, Nov. 22, 2019.
Saikia et al. "Frequency-Shifted Reflection of Electromagnetic Waves Using a Time-Modulated Active Tunable Frequency-Selective Surface", IEEE Transactions on Antennas and Propagation, 68(4): 2937-2944, Apr. 2020.

\* cited by examiner

FIG. 4A
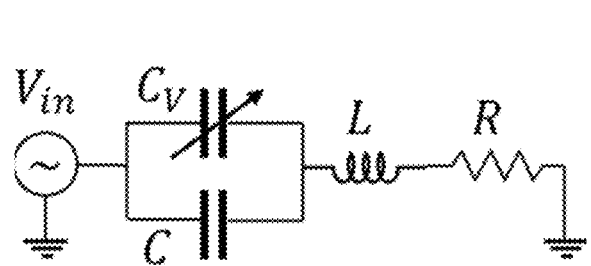
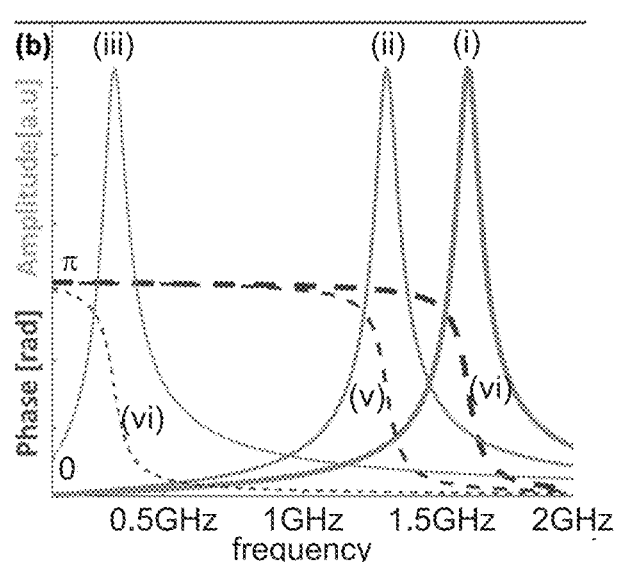
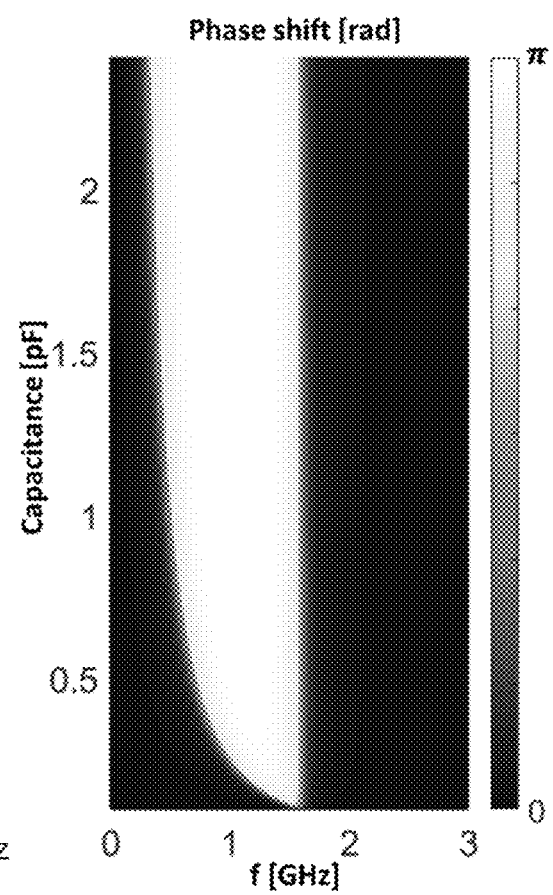
FIG. 4B
FIG. 4C

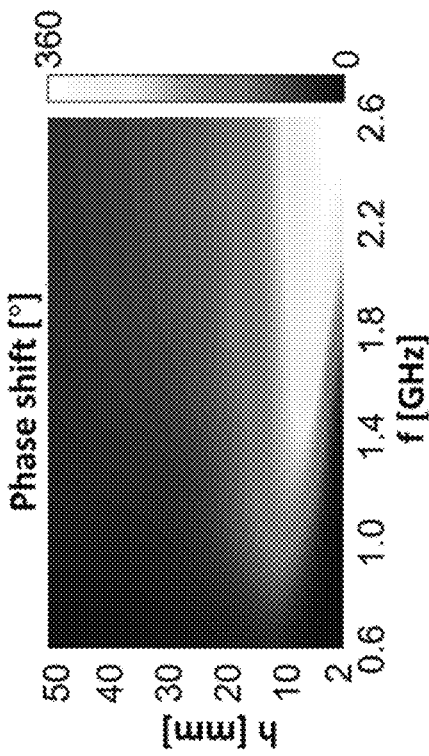
FIG. 5B
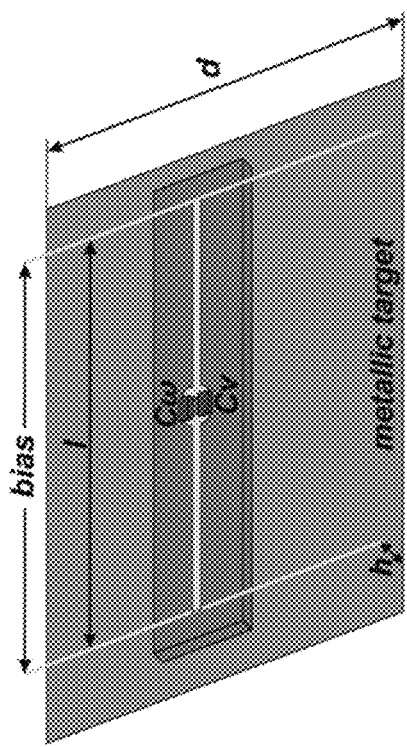
FIG. 5A
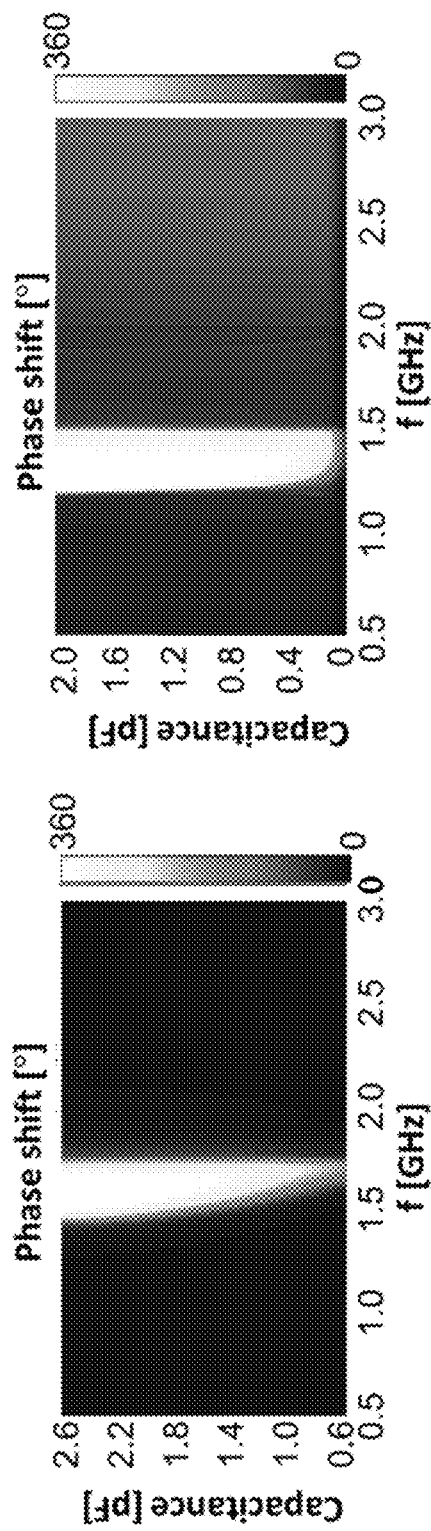
FIG. 5D
FIG. 5C

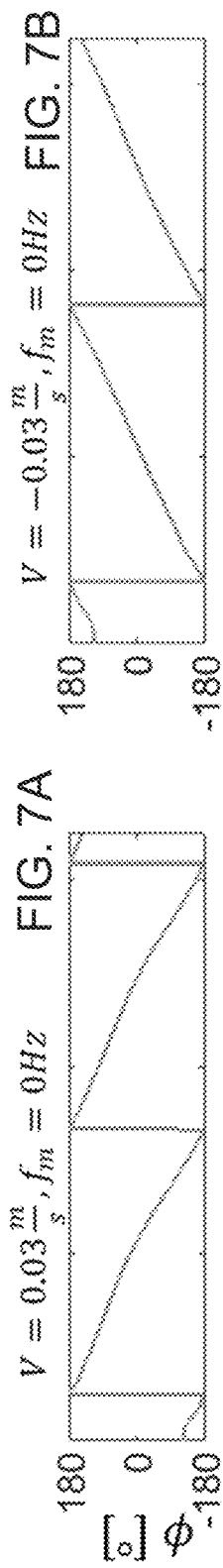

FIG. 8A
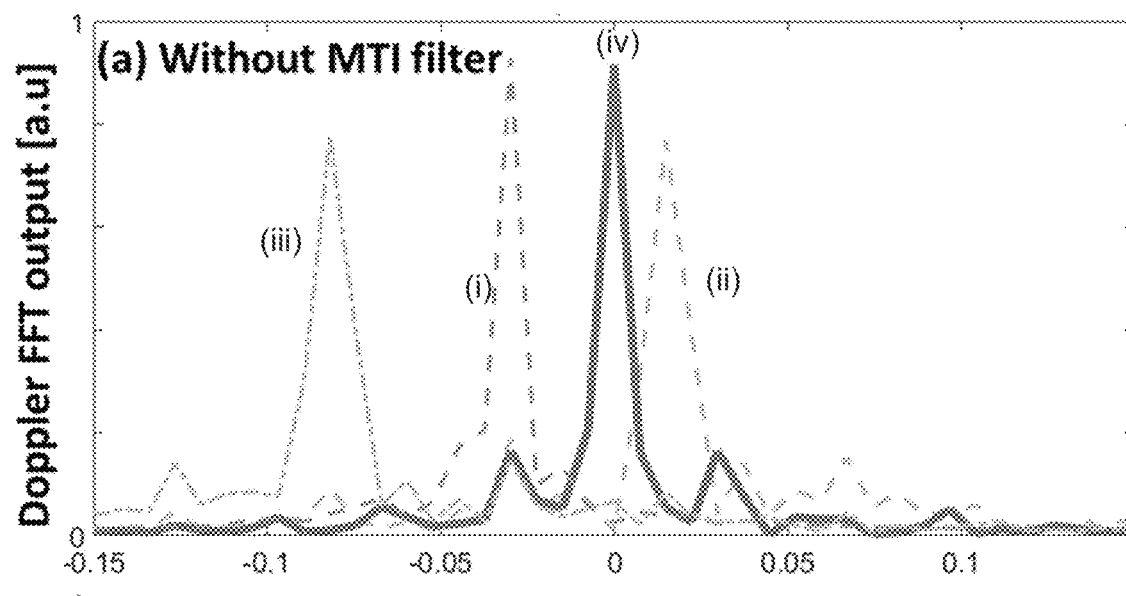
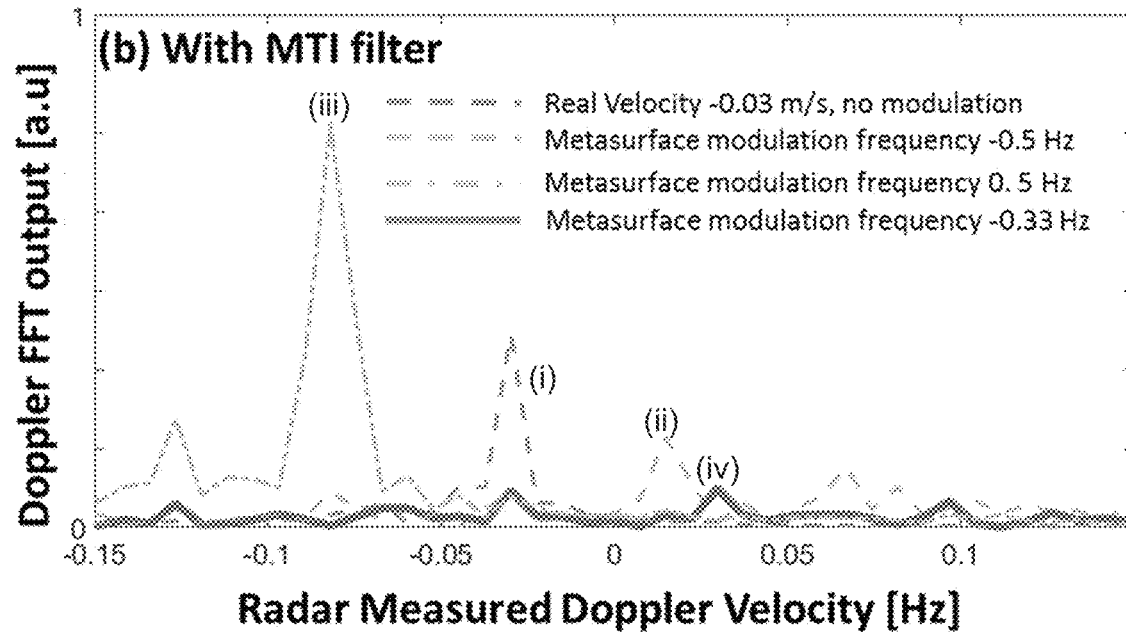
FIG. 8B

SYSTEM AND METHOD FOR DECEPTION AND CLOAKING OF DETECTION SYSTEM

RELATED APPLICATIONS

This application is a National Phase of PCT Patent Application No. PCT/IL2021/050434 having International filing date Apr. 16, 2021, which claims the benefit of priority of Israel Patent Application No. 273995 filed on Apr. 16, 2020. The contents of the above applications are all incorporated by reference as if fully set forth herein in their entirety.

FIELD AND BACKGROUND OF THE INVENTION

The present invention, in some embodiments thereof, relates to cloaking and deception of a detection system and, more particularly, but not exclusively, to cloaking and/or deception of a Doppler radar. Embodiments of the present invention can generally be applied to against any detection system, which contains a moving target indicator (MTI), based on phase information.

The invention of radars was soon followed by extensive research and development of counter measures. By employing special geometric designs and carefully selected materials, a reduction of the target's radar cross section and the resulting backscattered energy was successfully achieved, substantially reducing distances between the radar and the target for successful detection. In addition to stealth technology, numerous active jamming countermeasures have been developed. In this case, signals are transmitted to the investigating radar systems, either to cause the radar to wrongly conclude estimation parameters, or to blind the radar by degrading the signal to nose ratio.

The field of meta-materials has further advanced the ability to cloak objects of interest from investigation by introducing man-made materials to tailor electromagnetic scattering [Schurig et al., Science 314, 977-980 (2006); Alitalo et al., Mater. Today 12, 22-29 (2009), Fleury et al., Prog. Electromagn. Res. 147, 171-202 (2014)].

SUMMARY OF THE INVENTION

The Inventors found that achieving requirements that are desired to provide a countermeasure against real radar systems is challenging. The Inventors found that some of the factors to consider are: (i) all angle of incidence operation, (ii) dial polarization operation, (iii) bandwidth, and (iv) conformity to geometries (including and not limited to mechanic rigidity, weigh and other system parameters), dictated by a real object, subject to cloaking.

According to some embodiments of the invention the present invention there is provided a cloaking system. The system comprises: a structure having a plurality of resonators characterized by a controllable resonance frequency, wherein the resonators are arranged to collectively ensure that variation of the resonance frequency over a predetermined range of resonance frequencies generates a phase shift between the an electromagnetic wave incident on the structure and an electromagnetic wave scattered off the structure; and a controller configured for controlling the resonance frequency to provide a time-varying resonance frequency characterized by a temporal function which comprises a linear time-dependence.

According to some embodiments of the present invention the system is configured for a central frequency of the incident wave, wherein at least one of the resonators has a dispersive response to the incident wave, the dispersive response being selected to ensure that the phase shift range is effective for any frequency within a frequency band of at least 10% of the central frequency.

According to some embodiments of the invention at least one of the resonators is configured to maintain, within a predetermined tolerance, equality between a frequency of the scattered wave and a frequency of the incident wave.

According to some embodiments of the invention at least one of the resonators comprises an electronic element having a controllable impedance, wherein the controlling the resonance frequency comprises varying the impedance.

According to some embodiments of the invention at least one of the resonators comprises an electric dipole defining an airgap, and an electronic element having a controllable impedance at the airgap.

According to some embodiments of the invention at least one of the resonators comprises a magnetic dipole, and an electronic element having a controllable impedance.

According to some embodiments of the invention the system comprises a metal screen and dielectric structure, between the resonators and the metal screen, wherein the resonators are mounted on the dielectric structure.

According to some embodiments of the invention the controller is configured to receive velocity data characterizing a motion of a vehicle and to select the time-varying resonance frequency based on the velocity data.

According to an aspect of some embodiments of the present invention there is provided a vehicle. The vehicle comprises a propulsion system carried by a vehicle body; and the system as delineated above and optionally and preferably as further detailed below, mounted on an external surface of the vehicle body.

According to some embodiments of the invention the vehicle is a manned vehicle. According to some embodiments of the invention the vehicle is an unmanned vehicle. According to some embodiments of the invention the vehicle is a controllable vehicle. According to some embodiments of the invention the vehicle is an autonomous vehicle.

According to some embodiments of the invention the controller is configured to receive velocity data characterizing a motion of the vehicle and to select the time-varying resonance frequency based on the velocity data.

According to an aspect of some embodiments of the present invention there is provided a method of cloaking or deception a detection system transmitting an electromagnetic wave characterized by a central frequency. The method comprises: scattering the detection system's wave off a structure having a plurality of resonators characterized by a controllable resonance frequency, wherein the resonators are arranged to collectively ensure that variation of the resonance frequency over a predetermined range of resonance frequencies generates a phase shift between the detection system's wave and an electromagnetic wave scattered off the structure; and controlling the resonance frequency to provide a time-varying resonance frequency characterized by a temporal function.

According to some embodiments of the invention at least one of the resonators has a dispersive response to the detection system's wave, the dispersive response being selected to ensure that the phase shift range is effective for any frequency within a frequency band of at least 10% of the central frequency.

According to some embodiments of the invention the dispersive response comprises a frequency-dependent impedance.

According to some embodiments of the invention an associated reactance of the frequency-dependent impedance is a decreasing function of the frequency.

According to some embodiments of the invention at least one of the resonators is configured to maintain, within a predetermined tolerance, equality between a frequency of the scattered wave and a frequency of the incident wave.

According to some embodiments of the invention at least one of the resonators comprises an electronic element having a controllable impedance, wherein the controlling the resonance frequency comprises varying the impedance.

According to some embodiments of the invention the electronic element has a voltage-dependent impedance, and wherein the varying the impedance comprises varying a voltage applied to the electronic element.

According to some embodiments of the invention a time-dependence of the variation of the voltage is nonlinear and selected to at least partially cancel nonlinearities in a voltage-dependence of the impedance.

According to some embodiments of the invention the temporal function comprises a linear time-dependence.

According to some embodiments of the invention at least one of the resonators comprises an electric dipole defining an airgap, and an electronic element having a controllable impedance at the airgap.

According to some embodiments of the invention at least one of the resonators comprises a magnetic dipole, and an electronic element having a controllable impedance.

According to some embodiments of the invention the resonators are mounted on a dielectric structure which is between a metal screen and the resonators.

According to some embodiments of the invention the method comprises receiving velocity data characterizing a motion of a vehicle and selecting the time-varying resonance frequency based on the velocity data.

According to some embodiments of the invention the phase shift is over a respective range of at least $1.5\pi$.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 4A is a schematic illustration of an equivalent circuit of a scattering scenario, tested in experiments performed according to some embodiments of the present invention. A dipole is represented by internal inductance L, Ohmic+ radiation resistance R, capacitance C and an additional varactor capacitance $C_v$.

FIG. 4B shows amplitude [curves (i)-(iii)] in arbitrary units, and phase [curves (iv)-(vi)] in radians of a scattered field, as a function of a resonance frequency of the dipole of FIG. 4A, obtained according to some embodiments of the present invention by tuning the bias voltage drop on the varactor to effect shifts in the resonance frequency. Curves (i) and (iv) correspond to zero varactor capacitance, curves (ii) and (v) correspond to varactor capacitance of 0.05 pF, and curves (iii) and (vi) correspond to capacitance of 2.3 pF.

FIG. 4C is a color map of the achievable phase shift of the scattered field as a function of varactor capacitance and incident wave frequency, obtained in experiments performed according to some embodiments of the present invention.

FIGS. 5A-D show numerical modelling of a metasurface Doppler cloak, constructed from a 9×9 array of dipoles on a substrate above a metal ground plane which represents the target to be concealed. FIG. 5A illustrates a single unit cell containing the dipole, varactor and biasing network. FIG. 5B shows relative phase shift as a function of distance h between the dipole and metallic target, as well as the frequency of the incident radiation. FIG. 5C shows the phase shift as a function of varactor capacitance and incident frequency for dielectric width h=6 mm. FIG. 5D shows that improving the operational bandwidth—the phase shift from the metasurface after adding an additional frequency dependant capacitor $C\omega$, shown on FIG. 5A.

FIGS. 7A-G show analysis of moving targets—phases and amplitudes. V is the true velocity of the structure, $f_m$ is the temporal modulation frequency of the metasurface cover. FIGS. 7A, 7B, 7C, 7D, 7E and 7F show profiles of the temporal phases retrieved by the radar for various real velocities and metasurface modulation frequencies $f_m$ (negative modulation frequency corresponds to a receding phase slope). FIG. 7G shows the normalized temporal amplitude at the radar receiver for stationary target with modulation $f_m$=033 Hz.

FIGS. 8A and 8B show an output of a radar after Doppler FFT processing without MTI filtering (FIG. 8A) and with MTI filtering. Curve (i) corresponds to real velocity of −0.03 m/s without modulation, curves (ii)-(iv) correspond to metasurface modulation frequency of −0.5 Hz, 0.5 Hz, and −0.33 Hz, respectively. FIG. 8B demonstrates that judicious selection of the metasurface modulation frequency can shift the measured velocity to 0, causing the MTI to filter out the target with the rest of the clutter, making it invisible to the radar.

DESCRIPTION OF SPECIFIC EMBODIMENTS OF THE INVENTION

Figure 1A:
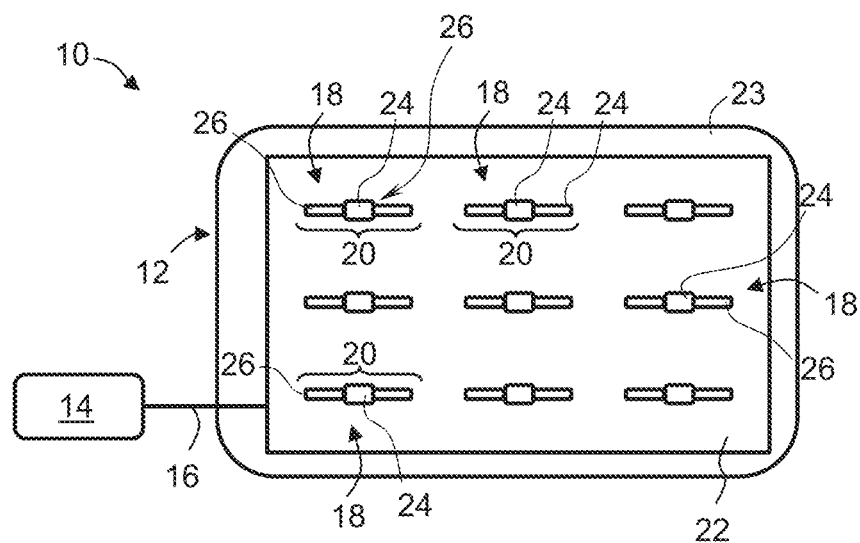
FIG. 1A is a schematic illustration of a system suitable for cloaking a detection system, according to some embodiments of the present invention.

The present invention, in some embodiments thereof, relates to cloaking and deception of a detection system and, more particularly, but not exclusively, to cloaking and/or deception of a Doppler radar. Embodiments of the present invention can generally be applied to against any detection system, which contains a moving target indicator (MTI), based on phase information.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIG. 1A is a schematic illustration of a system 10 suitable for cloaking a detection system, according to some embodiments of the present invention. The detection system can be any detection system. Preferably, the detection system contains a moving target indicator (MTI) based on phase information. In some embodiments of the present invention the detection system is a radar.

System 10 comprises a structure 12 having a controllable resonance frequency, and a controller 14, having a circuit configured for activating the structure 12. Controller 14 and structure 12 typically communicate via one or more communication lines 16, which can be wired, as illustrated, or wireless.

Structure 12 is a synthetic cellular structure that scatters a wave interacting therewith. The wave is typically an electromagnetic wave transmitted by a detection system (not shown) so as to interrogate an object (e.g., vehicle) carrying system 10. Preferably, but not necessarily, the scattered wave has at a frequency of from about 1 KHz to about 100 GHz.

As used herein, "cellular" is used to indicate that the structure defines a network of generally repeating and intercoupled cells 18. The coupling between the cells 18 is preferably near field coupling.

As used herein "near field coupling" refers to interaction by exchanging a non-radiative physical field (e.g., electric field, magnetic field, electromagnetic field).

Structure 12 can be in any known form that has controllable resonance frequency. Representative examples including, without limitation, a metamaterial a metasurface, a time-dependent mask and the like.

Preferably, but not necessarily, the cells 18 of structure 12 are arranged as an array. The array shown in FIG. 1A is defined over a rectangular grid, but this not necessarily be the case, since, for some applications, it may be desired to define a non-rectangular grid (e.g., triangular, hexagonal, etc).

Each of the cells 18 optionally and preferably comprises a resonator 20, which is a circuit that is configured to electromagnetically resonate at a frequency referred to as a resonance frequency. In various exemplary embodiments of the invention the resonance frequency of the resonator 20 is controllable, and the circuit of controller 14 is configured to control this frequency as further detailed below. Controller 14 can control each of the resonator circuits individually, or it can be configured to control one or more (e.g., all) the resonator circuits collectively. When two or more resonator circuits are controlled individually, the controller can set different resonance frequencies to different individually-controlled circuits. When two or more resonator circuits are controlled collectively, the controller can apply the same change to the resonance frequencies of all the collectively-controlled circuits (e.g., the controller can set the same resonance frequencies to the collectively-controlled circuits). Adjustable control over resonant frequencies can optionally and preferably also provide a countermeasure against frequency hopping interrogating systems.

Resonators 20 are typically mounted (e.g., soldered, glued, printed, or otherwise connected) on a dielectric structure 22, serving for supporting the array. Dielectric structure 22, is optionally and preferably conformal to surface of the object to be concealed from the detection system.

In use, the side of dielectric structure 22 which is opposite to the resonator array is mounted on an external surface of an object to be concealed from the detection system, thereby also serving as a spacer between the surface of the object and the resonators. The thickness of dielectric structure 22 is typically several millimeters but other thicknesses are also contemplated. Dielectric structure 22 is optionally and preferably made of a material that is transparent to the wave for which system 10 is designed, which is typically the frequency band of the electromagnetic radiation which is expected to be transmitted by the detection system. The dielectric losses can degrade the resonant behaviors of the structure 12, but can be compensated by additional elements. In some embodiments of the present invention a metal screen 23, can be introduced between the surface of the object to be concealed and the structure 12 to uncouple electromagnetic properties of the object's surface from structure 12. The thickness of screen 23 is optionally and preferably several skin depths of the incident wave.

In some embodiments of the present invention the circuit of controller 14 is configured for controlling the resonance frequency of resonators 20 to provide a time-varying resonance frequency. Preferably, the controller ensures that the resonance frequency variation is characterized by a temporal function which comprises a linear time-dependence, more preferably a temporal function which is dominated by a linear time-dependence, more preferably a linear temporal function. In some embodiments of the present invention the entire resonance of the structure 12 can be shifted to a desired frequency to cope with, for example, frequency hopping radars. The Examples section that follows demonstrates broadband operation by a circuit, such as, but not limited to, the circuit shown in FIG. 1B.

A temporal function is said to be dominated by a linear time-dependence, if a ratio between the nonlinear part and linear parts of the temporal function is less than 10% for any time during the variation applied by the controller.

Preferably, the linear time-dependence is linear modulo $2\pi$. Mathematically, a time-dependence which is linear modulo $2\pi$ can be written as $f(t)=a+b\ t\ (\mathrm{mod}\ 2\pi)$, where f is an observable (e.g., resonance frequency) which varies according to the time dependence, a is a constant offset parameter, b is a constant slope parameter, t is the time variable of the time-dependence, and mod is a function which returns the modulus of the operation, which in this case is the remainder of the division of t by $2\pi$.

The inventors found that sleeting a temporal function which comprises a linear time-dependence, is advantageous for cloaking, in particular when the incident wave is transmitted by a detection system employing a moving target indicator (MTI) filter, as will now be explained with reference to FIG. 2.

Figure 2:
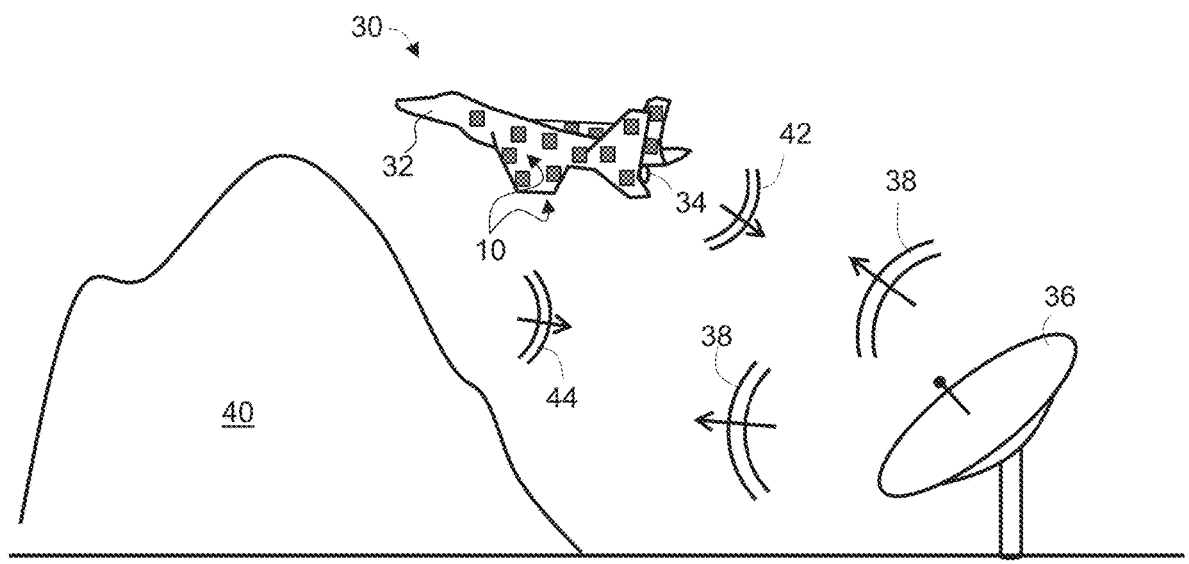
FIG. 2 schematically illustrates a radar cloaking scenario employed according to some embodiments of the present invention by the system shown in FIG. 1A.

FIG. 2 schematically illustrates a moving vehicle 30 having a body 32 carrying a propulsion system 34. Cloaking system 10 is mounted on an external surface of body 32. The system of the present embodiments can be mounted on any type of manned or unmanned vehicle, either controllable, or autonomous. Representative examples of vehicles suitable for the present embodiments include, without limitation, an aerial vehicle (e.g., a drone, an aircraft, a jet airplane, a helicopter, an unmanned aerial vehicle, a passenger aircraft, a cargo aircraft), a ground vehicle (e.g., an automobile, a motorcycle, a truck, a tank, a train, a bus, an unmanned ground vehicle), an aqueous vehicle (e.g., a boat, a raft, a battleship), an amphibious vehicle and a semi-amphibious vehicle.

Each of the gray squares that are shown in FIG. 2 on body 32 can enact system 10, including its own frequency-controllable structure and its own controller, or, more preferably, at least some of (e.g., all) the gray squares can be sub-systems of system 10, each comprising its own frequency-controllable structure but uses a controller that is shared among the sub-systems. In a preferred embodiment, the frequency-controllable structure(s) of system 10 cover a majority of the external surface area of body 32. FIG. 2 also illustrates a radar 36 which transmits a wave 38. A portion of wave 38 incidents on vehicle 30, and a portion of wave 38 incidents on static objects in the field-of-view of radar 36. A representative example of such a static object is mountain 40. Backscattered waves from vehicle 30 and mountain 40 are shown at 42 and 44, respectively.

Radar 36 receives the backscattered wave 42 and 44 and analyzes phase variations caused by the Doppler effect. Radar 36 considers echoes that do not exhibit phase variations as originating from static object, and filters out signals corresponding to those echoes, so as to reduce clutter. Such a filter is known as an MTI filter (see, e.g., Dawidowicz, B. et al., 2012, IEEE Trans. Aerosp. Electron. Syst. 48, 1347-1357). Thus, signals corresponding to wave 44 are filter out by the MTI filter, because mountain 44 is static and so wave 44 does not exhibits phase variation.

The inventors found that variation of the resonance frequency of the resonators of system 10 causes backscattered wave 42 to be phase shifted relative to transmitted wave 38. The inventors have therefore postulated, and showed experimentally, that by controlling the resonance frequency of the resonators according to a temporal function which comprises a linear time-dependence the change of the phase of wave 42 due to the Doppler effect can be at least partially compensated. Such a compensation or partial compensation conceals the Doppler signature of vehicle 30, making it appear to radar 36 as stationary as, e.g., mountain 40, or any other object, e.g., a tree a cloud a ground or the like. This causes the MTI filter of radar 36 to filter out also the signals corresponding to wave 42, thus significantly reducing the visibility of vehicle 30, or, more preferably, rendering it invisible to radar 36.

In some embodiments of the present invention the circuit of controller 14 (see FIG. 1A) receives velocity data characterizing the motion of vehicle 30 and selects the time-varying resonance frequency based on the velocity data. For example, controller 14 can derive from the velocity data a linear time-dependence characterized by a slope parameter that is linearly proportional to the velocity of vehicle 32, and vary the resonance frequency according to the derived time-dependence, preferably modulo $2\pi$, thus compensating for the Doppler phase shift due to this velocity. The controller can also include a detection of arrival (DoA) detector to define the interrogation direction. The time-variation optionally and preferably compensates the radial velocity in respect to the antenna of the detection system. Angular reflectivity of the device can also be adjusted accordingly.

In some embodiments of the present invention the circuit of controller 14 is configured to not significantly modulate the frequency of the transmitted wave 38. In other words, in these embodiments the circuit of controller 14 maintains, within a predetermined tolerance (e.g, ±20%, or ±10%, or ±5%), equality between the frequency of scattered wave 42 wave and the frequency of transmitted wave 38.

The resonators 20 of system 10 are preferably arranged to collectively ensure that when the resonance frequency is varied over a predetermined range of resonance frequencies, the resulted phase shift between the wave incident on structure 12 and the wave scattered off structure 12, is over a respective range of at least $1.5\pi$, more preferably at least $1.8\pi$, more preferably at least $1.9\pi$, e.g., about $2\pi$ or more. Specifically, characterizing the predetermined range of resonance frequencies by a lower frequency threshold $f_L$ and an upper frequency threshold $f_U$, and the resonators 20 of system 10 are preferably arranged to collectively ensure that there is a one-to-one mapping between the range $[f_L, f_U]$ and the phase shift range $[0, \phi MAX]$, where $\phi_{MAX}$ is at least $1.8\pi$, more preferably at least $1.9\pi$, most preferable about $2\pi$ or more. For example, a resonance frequency of $f_L$ can be mapped to a zero phase shift, a resonance frequency of $f_U$ can be mapped to a phase shift of $\phi_{MAX}$, and any resonance frequency f satisfying $f_L<f<f_U$ can be mapped to a unique phase shift $\phi$ satisfying $0<\phi<\phi_{MAX}$.

With reference to FIG. 1A, the controllability of the resonance frequency of resonator 20 can in some embodiments of the present invention be achieved by providing each resonator with an electronic element 24 having a controllable capacitance or any other resonant shifting element, such as, but not limited to, an inductor. In this case controller 14 controls the resonance frequency of the resonator by varying the impedance (e.g., capacitance) of element 24. For example, electronic element 24 can have a voltage-dependent impedance, and controller 14 can control the resonance frequency by varying the voltage applied to the electronic element. A representative example of an electronic element with a voltage-dependent impedance, and which is suitable for the present embodiment is a varactor. The dependence of the impedance on the voltage need not to be linear. For example, in varactors the impedance typically varies nonlinearly with the applied bias voltage. When the dependence of the impedance on the voltage is nonlinear, controller 14 preferably varies the voltage nonlinearly with the time according to a nonlinear time-dependence selected to at least partially cancel the nonlinearities of the voltage-dependence of the impedance. A representative procedure for canceling nonlinearities of the voltage-dependence is described in the Examples section that follows.

Resonator 20 typically also comprises an antenna 26 that interacts with the incident wave and resonate responsively to this interaction. In the schematic illustration of FIG. 1A, which is not to be considered as limiting, the antenna 26 is a dipole antenna defining an airgap 28, wherein electronic element 24 is at the airgap 28. It is to be understood that other shapes for the antenna 26 are also contemplated.

While the embodiments below are described with a particular emphasis to electric dipoles, it is to be understood that the present embodiments also contemplate use of magnetic dipoles instead of, or in addition to, electric dipoles.

In some embodiments of the present invention one or more of resonators 20 has a dispersive response to the incident wave. This is advantageous since the dispersive response of resonator 20 can be selected to increase the bandwidth over which the aforementioned one-to-one mapping between the range of resonance frequencies and the phase shift range is effective. Preferably, the dispersive response is selected such that the phase shift range is effective for any frequency within a frequency band of at least 10% or at least 15% or at least 20% or of the central frequency of the incident wave.

Figure 1B:
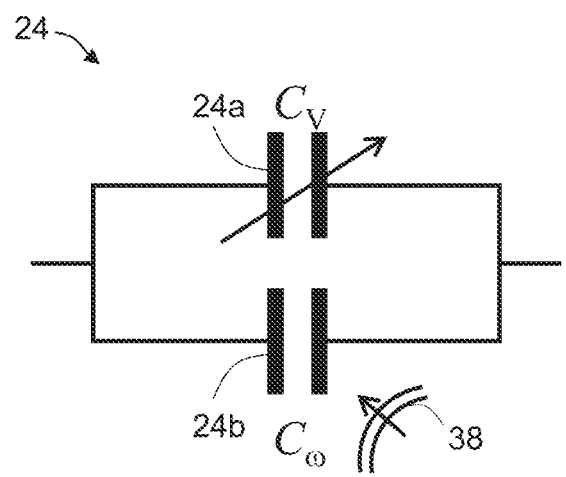
FIG. 1B is a schematic illustration of an equivalent circuit describing electronic properties of an electronic element of the system shown in FIG. 1A, according to some embodiments of the present invention.

A dispersive response of resonator 20 can be achieved by constructing the electronic element 24 as a dispersive element. For example, the dispersive response can be a dispersive impedance (e.g., capacitance), in which case electronic element 24 can be constructed to exhibit a dispersive impedance property, e.g., a frequency-dependent impedance. When the controllability of electronic element 24 is embodied as a voltage-dependent impedance, the dispersive impedance of electronic element 24 can be achieved by combining two or more frequency responsive elements (e.g., capacitive elements, inductive elements), where at least one of these capacitive elements has a voltage-dependent impedance and at least one these frequency responsive elements has a frequency-dependent impedance, thereby providing an electronic element in which the impedance varies both with the voltage and with the frequency. The use of dispersive element is advantageous since it increases the operation bandwidth. However, the inventors found that the system of the present embodiments is useful against many detection systems even without dispersive elements, wherein element 24 is a nondispersive element. A schematic illustration of an equivalent circuit describing the electronic property of electronic element 24 suitable for these embodiments is provided in FIG. 1B. Shown in FIG. 1B are a controllable voltage-dependent capacitor 24a (e.g., a varactor) and a frequency-dependent capacitor 24b, connected in parallel to each other so that the effective capacitance C of element 24 is $C=C_v+C_w$, where $C_v$ is the capacitance of capacitor 24a and $C_w$, is the capacitance of capacitor 24b. While FIG. 1B illustrators to additional elements in the equivalent circuit, it is to be understood that the equivalent circuit may include additional or other elements, provided these elements aid in tuning the resonance frequency of the cells 18.

In various exemplary embodiments of the invention the frequency-dependent capacitor 24b is not controlled by controller 14, so that any variation in the capacitance Cm of capacitor 24b is in response to the incident wave 38. In some embodiments of the present invention the associated reactance of the frequency-dependent capacitance $C_\omega$ of capacitor 24b is a decreasing function of the frequency. It is to be understood that capacitor 24b need not be a capacitor per se, and that active electronic circuitry can be designed to enact capacitor 24b.

Figure 3:
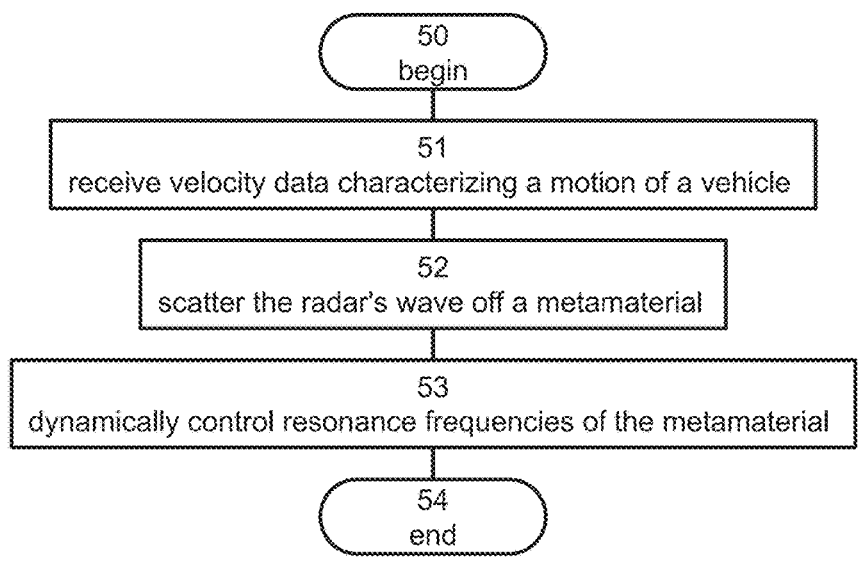
FIG. 3 is a flowchart diagram describing a method suitable for cloaking a detection system transmitting an electromagnetic wave characterized by a central frequency, according to some embodiments of the present invention.

Reference is now made to FIG. 3, which is a flowchart diagram describing a method suitable for cloaking a detection system transmitting an electromagnetic wave characterized by a central frequency, according to some embodiments of the present invention. Selected operations of the method can be executed using system 10.

The method begins at 50 and optionally and preferably continues to 51 at which the method receives velocity data characterizing a motion of a vehicle. The method continues to 52 at which the detection system's wave is scattered off a frequency-controllable structure, such as, but not limited to, structure 12. The method continues to 53 at which resonance frequencies of the structure are dynamically control to provide a time-varying resonance frequency characterized by a temporal function which comprises a linear time-dependence, as further detailed hereinabove. In some embodiments of the present invention the temporal function is selected based on the velocity data as further detailed hereinabove.

As used herein the term "about" refers to ±10%

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Concealing objects from interrogation has been a primary objective since the integration of radars into surveillance systems. Metamaterial-based invisibility cloaking, which was considered a promising solution, did not yet succeed in delivering reliable performance against real radar systems, mainly due to its narrow operational bandwidth. This Example demonstrates an approach, which addresses the issue from a signal-processing standpoint and, as a result, is capable of coping with the vast majority of unclassified radar systems by exploiting vulnerabilities in their design. In particular, this Example demonstrates complete concealment of a 0.25 square meter moving metal plate from an investigating radar system, operating in a broad frequency range approaching 20% bandwidth around the carrier of 1.5 GHz. The radar countermeasure is based on a temporally modulated coating. This auxiliary structure is designed to dynamically and controllably adjust the reflected phase of the impinging radar signal, which acquires a user-defined Doppler shift. A particular case discussed herein imposes a frequency shift that compensates for the real Doppler signatures originating from the motion of the target. In this case the radar considers the target static, even though it is moving. As a result, the reflected echo is discarded by the clutter removal filter, which is a part of any modern radar system that is designed to operate in real conditions. This allows rendering the target invisible to the radar even though it scatters electromagnetic radiation.

INTRODUCTION

Modern radar systems can simultaneously measure the location and radial velocity of investigated targets. In the simplest terms, their method of operation is based on transmitting modulated (for example pulsed) electromagnetic radiation towards a target and recording the reflected echoes [23-25]. From the delay between the transmitted and received signals (time of flight) the range to the target can be deduced, while the phase difference between consecutive pulses, produced by the Doppler effect, allows the measurement of the instantaneous radial velocity.

The semi-passive approach to radar invisibility described in this Example does not require transmitting signals to confuse or jam the radar, nor does it require a lot of a priori knowledge about the type of radar at hand. Instead, a temporally modulated reflecting coating is suggested, which can control the time dependent phase of the electromagnetic field as it is backscattered towards the interrogating radar.

Owing to the fact that the Doppler information is extracted from the difference in the phase of consecutive pulses, dynamically controlling the reflected phase from the target produces backscattered echoes, which contain fake Doppler signatures that are indistinguishable from the ones created by genuine motion. It is therefore possible to deceive a radar system into concluding it is observing a moving target when the target is in fact stationary. The method described in this Example makes it possible to compensate the real phase difference between consecutive pulses, which originates from the movement of the target, thereby cloaking the signatures of motion and making the target appear stationary to the radar.

The Doppler-cloaked target still scatters a lot of energy since it is not employing any method of scattering suppression. The method of the present embodiments serves to deny the interrogating system information about the target's instantaneous velocity, which is useful for the proper operation of numerous radar systems relying on clutter removal methods, such as the moving target indicator (MTI) filter [26-29]. The absence of Doppler information originating from the target makes it indistinguishable from the surrounding clouds, mountains and ground, which can backscatter much more energy with very small Doppler shifts. This means that the MTI filter removes the energy related to the target along with the rest of the clutter, rendering it effectively invisible to the radar.

For narrowband radars, typically defined as those having less than 5% bandwidth around the central frequency, it is sufficient to cloak the Doppler signature around the central frequency. For broadband signals, on the other hand, the Doppler shift in the entire range should be cloaked, requiring broadband phase matching as will be discussed ahead.

Theory and Modelling

In order to understand the operation of the metasurface Doppler cloak, it is instructive to consider a single dipole, which allows gaining physical insight into the phenomenon. This insight will be used to understand the basic operation principle behind the suggested broadband invisibility concept.

Controlling the Scattered Phase from a Single Dipole

The polarizability of a dipole has a Lorenzian shape in the frequency domain [30], where near the resonance the phase is approximately linear in frequency. The dipole is excited by an incident radiation, which is partially reflected back into the source (e.g. a radar antenna). If the resonant frequency of the dipole it temporally modulated, the scattered field acquires an additional time-dependent phase shift. Note that radar systems almost never rely on the amplitude of scattered echoes for detection, mainly due to its unpredictability in real environments and unidentified targets. Temporal modulation of the dipole is realized by incorporating a voltage-controlled capacitor (varactor) within the structure. FIG. 4A demonstrates a lumped elements scheme for the scattering scenario containing the dipole and varactor. The impinging wave is represented by the voltage source $V_{in}$, while the resistance R, capacitance C, and inductance L characterize the dipole and depend on the material composition and geometric shape of the resonator. Placing a voltage dependant varactor in the feeding gap of the dipole can serve as a resonance-shifting element, allowing control over the scattered phase, shown in FIG. 4B. The varactor is represented on the scheme as an additional capacitor $C_v$ in parallel to the dipole's natural one (C). The current flowing through the resistor is related to the scattered electromagnetic field and its phase is the goal of the following derivation. The current in the frequency domain is given by:

$$i = \frac{j\omega(C + C_v(t))V_{in}}{1 + j\omega R(C + C_v(t)) - \omega^2 L(C + C_v(t))}, \quad (1)$$

where $\omega$ is the angular frequency of the impinging radiation. It is important to note that a time scale separation method is used to derive Eq. 1. The assumption is that any time-dependent changes in the varactor's capacitance are far slower than the carrier frequency of the exciting radiation. In this case, the dipole may be considered as stationary at any particular time, solving the fast scattering problem while keeping the capacitance $C_v(t)$ as a parameter. As it will be shown ahead, the required modulation frequency of the varactor is of no more than a few kHz, while typical radar systems transmit above 1 GHz, making this approximation perfectly justifiable.

The phase of the current in Eq. 1 is given by:

$$\varphi = \tan^{-1}\left(\frac{\text{Im}\{i\}}{\text{Re}\{i\}}\right) = \tan^{-1}\left(\frac{\omega^2 L(C + C_v(t)) - 1}{\omega R(C + C_v(t))}\right). \quad (2)$$

FIG. 4B summarizes the results of Eq. 2, demonstrating that the phase undergoes rapid change from π to 0 around the resonant frequency, which is controlled by the varactor capacitance. Other system parameters used for the plot are: C=0.1 pF, L=0.1 μH and R=50Ω. Note that these values were chosen in order to obtain a response similar to the one found in experiment, yet this combination is obviously not unique. Since radar systems are not sensitive to absolute phase, but rather to the phase difference between consecutive pulses, it is more instructive to inspect the change in phase as a function of varactor capacitance:

$$\Delta\varphi(C_V(t), \omega) = \varphi(t) - \varphi(0) = \\ \tan^{-1}\left(\frac{RC_v(t)\omega}{1 + (R^2C(C + C_v) - L(2C + C_v))\omega^2 + L^2C(C + C_v(t))\omega^4}\right). \quad (3)$$

where $C_v(0)$ is assumed to be 0 for simplicity. Plotting Eq.3 versus the incident frequency f=ω/2π produces FIG. 4C, where a knife-like image may be seen. Any horizontal cut-line of the knife represents a phase shift versus frequency, similar to the plots shown on FIG. 4B (specifically subtraction between curves (vi) and (vi)). On the other hand, controlling the bias of the voltage drop on the varactor diode while keeping the incident frequency constant, is equivalent to taking a vertical cut-line in FIG. 4C. It can be seen that with increasing varactor capacitance the phase goes from 0 to w abruptly in an almost step-like manner, with the transition capacitance depending on the incident frequency. This transition capacitance is located along the knife's edge, and its accurate conditions will be derived later on. The conclusion from the above discussion is that for any frequency of incident radiation, it is possible to continuously induce up to a π phase shift in the reflected field by carefully tuning the bias voltage of the varactor diode. While this π-shift can severely hamper the ability of an investigating system to deduce instantaneous velocity, full control over 2π phase is desirable for achieving complete invisibility, as will be discussed ahead.

Achieving 2π phaseshift

As demonstrated above, a single dipolar scatterer is not sufficient to provide full phase control over the reflected wave, motivating the development of more advanced configurations. This Example shows that resonator-based reflect arrays, often termed as metasurfaces, indeed can allow controllable 2π phase shift of the reflected waves. A typical example is a structure with a switchable characteristic impedance, which has properties resembling either perfect electric or a perfect magnetic conductor. In this case the reflection coefficient varies from '−1' to '1' respectively and thereby allowing to obtain full control over the reflected phase [21,32]. While analytic models for arrays of scattering dipoles do exist [33,34], they might be quite cumbersome for obtaining immediate physical insights. In addition, these models tend to neglect higher-order multipolar interaction, edge effects in finite sized systems and several other aspects, which might be important in practical realizations. Instead, it is frequently preferable to use full wave numeric simulations in order to optimize the metasurface and obtain the desired results. This is the approach undertaken ahead using the time domain FDTD method implemented in CST Studio. FIG. 5A shows a single unit cell of a 9×9 array of dipoles on a dielectric substrate (FR-4, $\varepsilon_r$=4.3), which is located above a metallic surface, assumed to be a perfect electric conductor. The metallic surface represents the target that is to be cloaked. A biasing network, made out of thin wires, provides the temporal modulation of the voltage drop, which is used to control the capacitance of the varactor. An additional capacitor $C_\omega(\omega)$ is shown in parallel to the varactor, however it will only be required later on and is assumed to be disconnected in the following discussion. FIG. 5B shows a color map of the phase shift of the reflected field as a function of substrate thickness (distance between the dipole and the metal surface, denoted as 'h' on FIG. 5A) and incident frequency. The map is obtained by repeating the full wave simulation for different substrate thicknesses, while discretely switching the capacitance between the maximum and minimum values of 2.6 pF and 0.6 pF, in accordance with the datasheet of the varactor diode that is used in the experimental set up. A full 2π phase shift is thus clearly achievable for substrate thicknesses between about 2 and 15 millimeters, when the other dimensions are fixed at d=50 mm, l=40 mm, ls=42 mm, ws=10 mm, w=10 mm, the dipole width is 1 mm and the width of the biasing network wires is much smaller than 1 mm. It is worth noting that this numerical optimization of the entire structure allows approaching experimental realization quite closely, as will be seen later.

FIG. 5C shows the phase shift of the metasurface as a function of the incident wave frequency and the varactor's capacitance, bearing a remarkable resemblance to FIG. 4C. Indeed, a knife-like image can be seen on both plots. The difference lies in the fact that a maximal controllable phase shift of $2\pi$ can be obtained with this array, unlike the $\pi$ phase shift attainable with a single dipole. The resulting array is similar to the phase switched screen, which was previously used to redistribute the reflected energy outside of the receiving radar band, therefore making it less visible to the interrogator. This was achieved by fast switching of reflectivity between two values, causing broadband modulation of the incident field.

This Example investigates a perturbative and quasi-static approach, which does not significantly modulate the frequency of the incident wave—this is useful in the case of wide-band radar systems and provides significantly better performances in passive deception applications, since the low frequency modulation does not radiate at the switching frequency. The purpose of the modulation is to produce a linear time dependent phase shift of the backscattered field, which exactly compensates for the linear phase shift produced by the motion of a target via the Doppler effect. The linearity of the phase can be achieved by modulating the bias voltage in time with the inverse function of the capacitance-phase relation shown on the vertical cuts of FIG. 5C, which serves to "straighten out" the phase dependence on time at the frequency of interest. However, linear phase response is not retained across the entire band, seeing as the threshold varactor capacitance, which is the edge of the knife in FIG. 5C, varies from frequency to frequency. Additional correction is optionally and preferably be taken to achieve broad phase matching.

Broadband Phase Matching

It is preferred to control the phase change across a range of frequencies with an identical (shared along the band) driving varactor bias voltage. The time dependant varactor biasing approach, summarized in FIG. 5C, shows that the discussed metasurface might not cover the entire bandwidth of a wideband radar system (typically defined as above 5% around the carrier). The reason is that for a range of frequencies the phase difference transitions from 0 to $2\pi$ occurs at different varactor capacitance values. In order to achieve a broadband response, the knife-shape of FIG. 5C is optionally and preferably be transformed into a rectangular form, where the transition from 0 to $2\pi$ occurs at the same cutoff values of the varactor capacitance, leading to broadband phase matching. To accomplish this goal, an additional frequency-dependent capacitor is optionally and preferably introduced within the circuit in parallel with the varactor, as shown on FIG. 5A. The goal of this new element is to 'straighten out the knife' by shifting the frequency dependent threshold capacitance toward lower varactor values. In the case of the single dipole discussed earlier, this transitional cutoff capacitance $C_\omega(\omega)$ may be derived from Eq. 3. by updating the lumped elements scheme to include the new dispersive element $C_v \rightarrow C_v + C_\omega$, and setting $$\Delta\varphi = \frac{\pi}{4}$$

as a convenient but arbitrary value for the threshold, after which the phase difference transitions from 0 to $2\pi$. It is then possible to solve and obtain an expression for $C_\omega$:

$$C_\omega(\omega) = \frac{1 + \left(R^2 C^2 \omega^2 + (LC\omega^2 - 2)LC\omega^2\right)}{RC\omega - R^2 C^2 \omega^2 - LC\omega^2(LC\omega^2 - 1)} C. \quad (4)$$

Analysis of Eq. 4 shows that $C_\omega$ is a decaying function of frequency (for the values of L, C and R that were used before) and its plot versus frequency is in fact the edge of the knife shown on FIG. 4C. For the array of dipoles, on the other hand, no simple formula exists and a numerical approach is undertaken in a similar fashion by using the color map of FIG. 5C in order to obtain the threshold capacitance. FIG. 5D shows a simulation, which is identical to the one performed in FIG. 5C, with the exception of an additional frequency dependent capacitor that was placed in the gap of each dipole in the array. The frequency dependant capacitor was modelled as two subwavelength metallic plates with a frequency dependant dielectric material in between. The material demonstrates anomalous dispersion, which resembles the leading edge of the "knife's edge", and provides, in fact, the required rectifying capacitance $C_\omega$. It can be seen that after adding this capacitor, around 300 MHz of bandwidth become available for simultaneous phase switching. This represents more than 20% of bandwidth around the carrier (assuming the carrier is in the middle of the band). An additional shift of the rectified knife in comparison with the knife shape in FIG. 5C is observed. This is due to the addition of the new capacitor, and is expected due to the fact the dispersive capacitance values do not vanish anywhere in the observed frequency band, serving to lower the resonant frequency of the array. It is noted that $-1/(\omega C_\omega)$ is decreasing with frequency. This behaviour can be achieved by using dispersive dielectric materials between the capacitor's electrodes, or alternatively using active circuits [36].

Experiment

Figure 6:
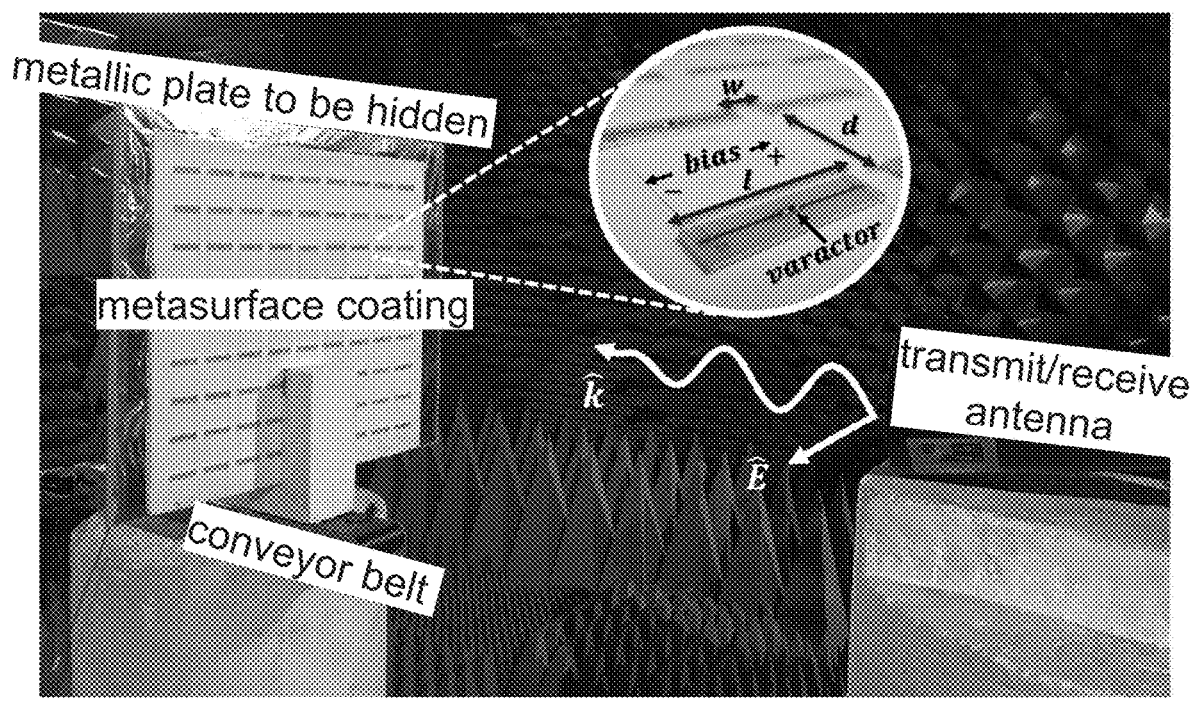
FIG. 6 is a schematic illustration of an experimental device used in experiments performed according to some embodiments of the present invention.

In order to demonstrate the capabilities of the described metasurface at concealing a large target from an investigating radar, an experimental device was fabricated and is shown on FIG. 6.

The array of 9×9 dipoles was manufactured according to the simulation presented in the previous section with the same dimensions. The dipoles were chemically etched from a copper surface that was deposited on top of a dielectric FR-4 substrate. SMV1405 varactors were soldiered in the dipole gaps, while the edges of the dipoles were soldiered to thin wires forming the biasing network. The array of dipoles was glued on top of a supporting structure, which was transparent to centimetre waves and served as a spacer of 15 mm, altogether forming the metasurface.

This metasurface was designed to be placed in front of the metal plate, which was the target to be hidden from the radar. The target covered by the metasurface was placed on a polyester structure that connected it to a motorized conveyor belt, which enabled moving it forward and backward with a controllable speed reaching up to about 0.04 m/s. A stepped frequency continuous wave (SFCW) radar system was implemented with a Network Analyzer, which is capable of sweeping the entire band of interest (1.2-1.7 GHz) while recording the amplitude and phase of the received echoes from the target. This type of radar is typically used in ultra-wideband applications since it is able to transmit carriers sequentially, while the receiver is locked on the transmitted frequency in a predefined time window.

This architecture allows avoiding expensive high frequency samplers that would otherwise be needed for sampling extremely short pulses [37]. The radar's antenna was placed directly in front of the moving conveyor inside an anechoic chamber and served both for transmitting and receiving the radiation (monostatic radar scheme), linearly polarized in the direction of the dipoles (horizontal).

Moving the concealed target without modulating the bias voltage produced linear phase shifts in time as can be seen on FIGS. 7A and 7B, which show forward and backward motion correspondingly at constant velocity of 0.03 m/s and under 1.5 GHz radar illumination. It can be observed that the full span of $2\pi$ phase was traced in the process of the movement as expected.

In the following experiments the target was moved at a constant velocity of −0.03 m/s (negative sign indicating motion away from the radar) while various bias voltages were applied to the metasurface. Since the relationship between the modulating voltage and scattered phase is not linear, a calibration procedure was first performed. By applying a linear voltage modulation to the biasing network while keeping the target stationary, the nonlinear temporal phase profile was recorded. Applying the inverse of that function back into the input of the biasing network produced the calibrated linear phase shown on FIG. 7C, where a maximal phase shift of $\Delta\phi=330°$ is achieved, close to the theoretical maximum. It is noted that the phase modulation produced by the metasurface is very similar to the one produced by actual motion, as seen on FIG. 7B. Controlling the modulation frequency $f_m$ of the metasurface (which is the frequency of the applied periodic voltage drop on the biasing network) while moving the target leads to plots on FIGS. 7D, 7E, and 7F. The sign of the frequency indicates the direction of phase modulation (positive and negative signs correspond to increasing and decreasing phase in time, accordingly). The modulation frequency controls the slope of the phase shift $\phi_{Metasurface}(t)$ which is added together with the phase shift produced by the motion of the target via the Doppler Effect as follows:

$$\phi_{tot}(t)=\phi_{Doppler}(t)+\phi_{Metasurface}(t), \phi_{Metasurface}(t)=f_m\Delta\phi t. \quad (5)$$

FIGS. 7D, 7E and 7F show the results for the moving target while different modulation frequencies are applied to the metasurface. In FIG. 7D the modulation is of the same polarity as the real motion of the target, leading to their phases adding up as in Eq.5. The result is an overall faster changing slope, corresponding to faster motion than that of the real target. In contrast, FIG. 7E has the modulation polarity in the opposite direction to that of the real motion, causing the target to appear slower than it is, as well making it appear to be moving towards the radar while in reality it is moving away from it. In FIG. 7F, the modulation slope is very close to the one created by the real motion of the target, but with opposite polarity, causing almost complete flattening of the phase as a function of time. This corresponds closely to the case $\phi_{Doppler}(t)=-\phi_{Metasurface}(t)$, however slight oscillations of the moving platform in the experiment prevented perfect cancelation. This modulation frequency causes the structure to appear almost stationary to the radar, which means the MTI filter considers it as clutter, concealing the presence of the target as will be shown ahead. Ut is noted that the amplitude of the reflected signal is modulated as well, as shows in FIG. 7G. Since radar systems tend to rely on the phase of reflected echoes and not their intensity, this amplitude modulation does not affect the results ahead.

One of the most popular methods of extracting Doppler information from the phase difference of consecutive pulses is by using a fast Fourier transform (FFT) filter bank. This method, as many other alternatives, serves to average out the signal, which is reminiscent of finding the fittest linear approximation to the function. For real targets in field conditions the phase difference is unlikely to be perfectly linear, partially owing to the fact that the target may fluctuate, e.g. change direction rapidly, enter an area that degrades SNR conditions, or have different moving parts that add additional modulation to the reflected echoes, termed micro-Doppler [38-40].

The phases in the plots shown on FIGS. 7A-F were multiplied by the imaginary unit j, exponentiated and put through an FFT filter bank in order to estimate the velocity of the target from the peak of the FFT output, as shown on FIGS. 8A and 8B. FIG. 8A shows the output of the FFT for various modulation frequencies with the green dashed line being the output for the moving target without any modulation of the metasurface. The two orange-shade lines [curves (ii) and (iii)] correspond to modulation frequencies of ±0.5 Hz. For the positive modulation, the output estimates a larger velocity than the ground truth, as shown by the orange dashed outline and in correspondence with the phase in FIG. 7D. Conversely, for the negative modulation, the target appears slower to the radar as well as heading in the opposite direction (towards it), in correspondence with the phase profile of FIG. 7E. The red curve [curve (iv)] of FIG. 8A shows that a modulation frequency of −0.33 Hz shifts the perceived velocity of the target to 0, making it appear as stationary to the radar as any of the surrounding clutter. This result is in correspondence with FIG. 7F. FIG. 8B shows the same results as FIG. 8A but with the additional processing of an MTI filter implemented as a two-pulse canceller, performed before the FFT processing.

$$y_k=x_k-x_{k-1}, \quad (6)$$

where $x_k=e^{j\phi_k}$ and $\phi_k$ are samples of the phase as shown on FIGS. 7A-G. Intuitively, the above filter removes any static contributions of the signal, leaving only time-dependent components that change in between the samples. This can be seen more rigorously by taking the Z-transform of Eq.6. The transfer function of the two pulse canceler MTI is $$H(z)=1-z^{-1}, \quad (7)$$

which has zeros at normalized discrete frequencies of $2\pi n$, where n=0,1,2 and so on. This means that the DC contribution of the received signal, i.e. the clutter, is removed by the filter. The maximal passband is achieved at normalized discrete frequencies of $\pi(2n+1)$, meaning it is preferable to down-sample the phases in $x_k$ in a way that would allow the expected Doppler frequencies to pass without significant attenuation. This approach was undertaken to produce FIG. 8B, where the output of the FFT, corresponding to metasurface modulation frequency of −0.33 Hz, is completely attenuated. The curves corresponding to modulation frequencies of −0.5 Hz and 0 Hz are also slightly attenuated by the filter due to their relatively low velocity, while the output of the FFT remains virtually unchanged for the modulation frequency of 0.5 Hz. Small side-lobes remain due to the fact the phase is not completely flat, as shown in FIG. 7F. It is observable that the output of the FFT is somewhat coarse, which is the result of processing only a relatively small time window (and therefore a small amount of samples as per the transfer function restrictions discussed above). This constrain solely relates to the experimental setup, since a short conveyor belt was used and the observation time was limited. It is noted that typical settings for airborne target detection are tuned to remove anything moving slowly in the scene, since this can be associated with wind, birds and other nonstationary clutter that will otherwise produce false alarms.

Figure 9:
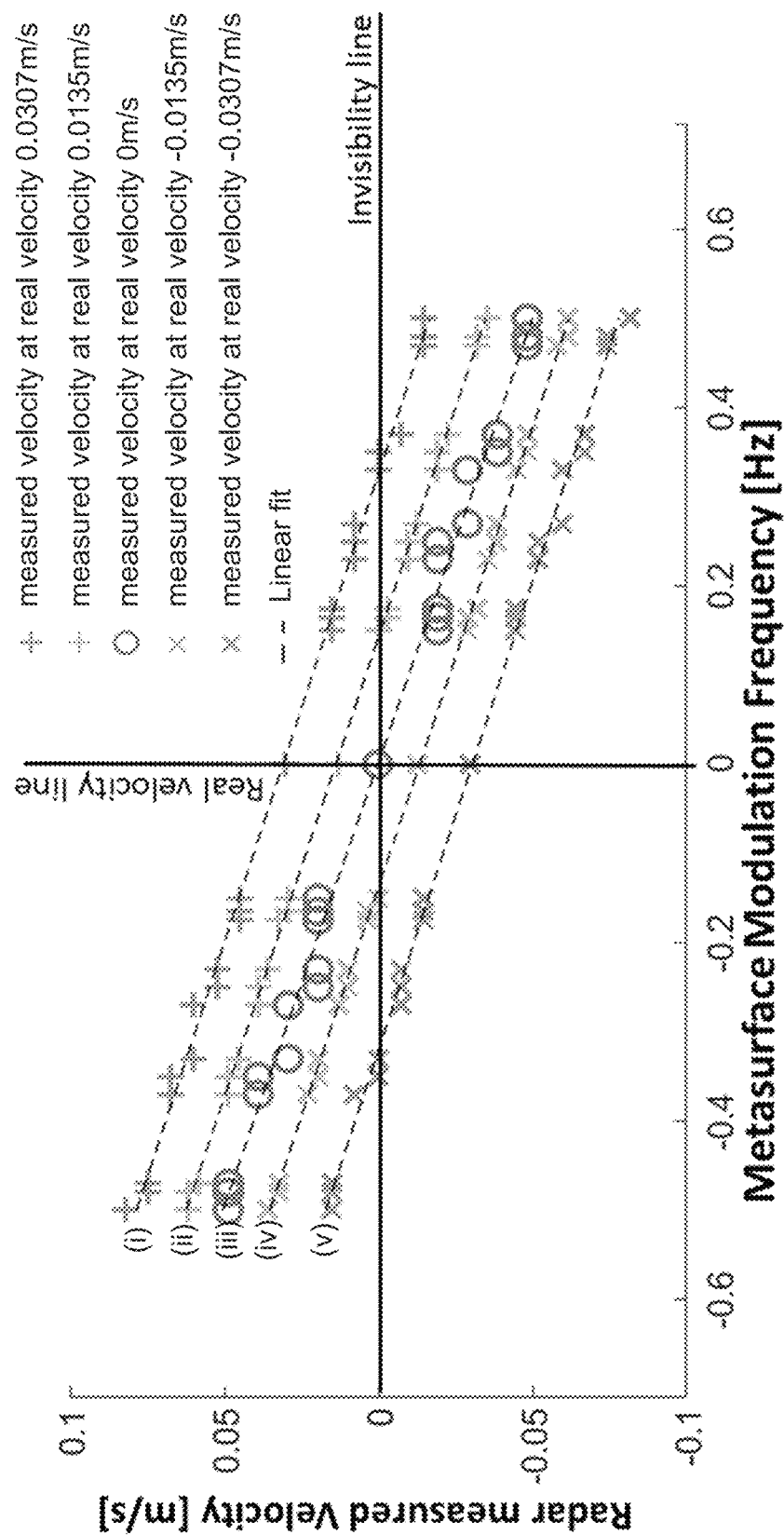
FIG. 9 shows radar measured velocity as a function of metasurface modulation frequency, obtained in experiments performed according to some embodiments of the present invention using FFT. The dash line (i) is a linear fit to data which is represented by the plus symbols plotted at its vicinity and which correspond to measured velocity at real velocity of 0.0307 m/s, The dash line (ii) is a linear fit to data which is represented by the plus symbols plotted at its vicinity and which correspond to measured velocity at real velocity of 0.0135 m/s, The dash line (iii) is a linear fit to data which is represented by the circle symbols plotted at its vicinity and which correspond to measured velocity at real velocity of 0 m/s, The dash line (iv) is a linear fit to data which is represented by the cross symbols plotted at its vicinity and which correspond to measured velocity at real velocity of −0.0135 m/s, The dash line (v) is a linear fit to data which is represented by the cross symbols plotted at its vicinity and which correspond to measured velocity at real velocity of −0.0307 m/s.

While FIGS. 8A and 8B show the output of the FFT for a select group of metasurface modulation frequencies, it is desirable to demonstrate full control over the velocity measured by the radar. To do so, the experiments mentioned earlier were repeated for 5 different real velocities of the cloaked target, as well as 25 different modulation frequencies, producing FIG. 9. Two lines are drawn and marked "real velocity line" and "invisibility line". The first indicates the velocity of the target without applying any modulation to the metasurface. The second reveals the required modulation frequency of the metasurface in order to conceal the target (by shifting its effective Doppler signature to 0). A linear relation between the modulation frequency and the measured velocity is observed, in accordance with Eq. 5. Some of the data points represented by the green x's on FIG. 9 are the same ones used in FIGS. 8A and 8B, as well as in FIGS. 7A-G.

Summary and Discussion

The problem of radar invisibility was revisited from a signal processing point of view. While quite a few efforts in the field concentrate on the scattering suppression approach, this Example demonstrates how to use loopholes in radar's post processing for concealing a target. Specifically, any real radar system uses a filter bank to improve SNR and cope with extremely small echoes from the targets of interest. One of the most dominant sources of noise in the receiver originates from static or slowly moving clutter, which causes substantial backscattered electromagnetic energy. Moving target indicators, regardless of their particular implementation, rely on Doppler information to isolate an object of interest from a clutter. The approach of the present embodiments uses this extremely powerful technique as a weakness. Temporally modulated metasurface covers were shown to be capable of imprinting arbitrary Doppler shifts on to the backscattered echoes. More importantly, they were shown to be able to compensate for real Doppler shifts caused by genuine motion of the target, causing a moving target to look like a stationary one. Any unclassified radar system, operating under real outdoor conditions filters out zero-Doppler targets, even though they reflect quite a substantial amount of energy. This phase-based realization has significant advantages over amplitude approaches, which aim on suppression of reflected energy. For example, reducing the reflection by a factor of 2 leads to only 3 dB SNR reduction, which is quite negligible for most radar systems, operating with 90 dB and even higher dynamic ranges. Only dramatic reduction of target's reflection coefficient for a broadband, mixed polarization, all angle of incidence causes successful concealment of the target. Meanwhile, the phase approach of the present embodiments already demonstrates perfect cloaking of macroscopic objects.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

REFERENCES

1. Bahret, W. F. The Beginnings of Stealth Tech nology. IEEE Trans. Aerosp. Electron. Syst. 29, 1377-1385 (1970).
2. Grant, P. M. & Collins, J. H. Introduction to electronic warfare. IEE Proc. F Commun. Radar Signal Process. 129, 113-132 (1982).
3. Friedman, H. J. Jamming Susceptibility. IEEE Trans. Aerosp. Electron. Syst. (1968).
4. Difranco, J. V. & Kaiteris, C. Radar Performance Review in Clear and Jamming Environments. IEEE Trans. Aerosp. Electron. Syst. AES-17, 701-710 (1981).
5. Capolino, F. Applications of Metamaterials. Applications of Metamaterials (2017). doi:10.1201/9781420054248
6. Zheludev, N. I. & Kivshar, Y. S. From metamaterials to metadevices. Nat. Mater. 11, 917-924 (2012).
7. Engheta, N. & Ziolkowski, R. Electromagnetic Metamaterials: Physics and Engineering Explorations. Wiley-IEEE Press (2006). doi:10 0-471-76102-8
8. Noginov, M. A. & Podolsky, V. Tutorials in Metamaterials. Tutorials in Metamaterials (2016). doi:10.1201/b11350
9. Metamaterials, O. Optical Metamaerials.
10. Smith, D. R., Pendry, J. B. & Wiltshire, M. C. K. Metamaterials and Negative Refractive Index. Science (80-. ). 305, 788-792 (2004).
11. Wolf, E. et al. Controlling Electromagnetic Fields. Science (80-. ). 312, 1780-1782 (2006).
12. Munk, B. A. Frequency Selective Surfaces. (2000).
13. Schurig, D. et al. Metamaterial electromagnetic cloak at microwave frequencies.
Science 314, 977-980 (2006).
14. Choudhury, B. & Jha, R. M. A Review of Metamaterial Invisibility Cloaks.
15. Alitalo, P. & Tretyakov, S. Electromagnetic cloaking with metamaterials. Mater.
Today 12, 22-29 (2009).
16. Fleury, R. & Alu, A. Cloaking and Invisibility: A Review. Prog. Electromagn.
Res. 147, 171-202 (2014).
17. Alu, A. & Engheta, N. Achieving transparency with plasmonic and metamaterial coatings. 1-9 (2005). doi: 10.1103/PhysRevE.72.016623
18. Leonhardt, U. Optical Conformal Mapping. Science (80-. ). 312, 1777-1781 (2006).
19. Chen, A. & Monticone, F. On Broadband Active Cloaking. in 2019 IEEE International Symposium on Antennas and Propagation and USNC-URSI Radio Science Meeting 1317-1318 (2019).
20. Ramaccia, D., Sounas, D. L., Aln, A., Toscano, A. & Bilotti, F. Doppler cloak restores invisibility to objects in relativistic motion. Phys. Rev. B 95, 1-6 (2017).
21. Ramaccia, D., Sounas, D. L., Alu, A., Toscano, A. & Bilotti, F. Phase-Induced Frequency Conversion and Doppler Effect with Time-Modulated Metasurfaces. IEEE Trans. Antennas Propag. 68, 1607-1617 (2020).

22. Liu, B. et al. Design and experimental demonstration of Doppler cloak from spatiotemporally modulated metamaterials based on rotational Doppler effect. Opt. Express 28, 3745 (2020).
23. Levanon, N. & Mozeson, E. Radar Signals. (2004).
24. Richards, M. A., Scheer, J. & Holm, W. Principles of Modern Radar. (2010).
25. Klemm, R., Griffiths, H. & Koch, W. Novel Radar Techniques and Applications. 2, (2017).
26. Kvernsveen, K. An Adaptive MTI Filter for Coherent Radar. in IEEE Digital Signal Processing Workshop 351-353 (1996).
27. Cloutier, G., Chen, D., Durand, L. & Member, S. A New Clutter Rejection Algorithm for Doppler Ultrasound. 22, 530-538 (2003).
28. Dawidowicz, B. et al. DPCA Detection of Moving Targets in Airborne Passive Radar. IEEE Trans. Aerosp. Electron. Syst. 48, 1347-1357 (2012).
29. Hyun, E. & Lee, J. Two—step Moving Target Detection Algorithm for Automotive 77 GHz FMCW Radar. (2010).
30. Kozlov, V., Filonov, D., Shalin, A. S., Steinberg, B. Z. & Ginzburg, P. Asymmetric backscattering from the hybrid magneto-electric meta particle. Appl. Phys. Lett. 109, 203503 (2016).
31. Kozlov, V., Kosulnikov, S., Filonov, D., Schmidt, A. & Ginzburg, P. Coupled micro-Doppler signatures of closely located targets. Phys. Rev. B 100, 1-6 (2019).
32. Werner, D. H. Broadband Metamaterials in Electromagnetics: Technology and Applications. (2017).
33. Novotny, L. & Hecht, B. Principles of Nano-Optics. (Cambridge University Press, 2012).
34. Ra, Y., Member, S., Asadchy, V. S. & Tretyakov, S. A. Total absorption of electromagnetic waves in ultimately thin layers. IEEE Trans. Antennas Propag. 61, 4606-4614 (2013).
35. Chambers, B. & Tennant, A. The phase-switched screen. IEEE Antennas Propag. Mag. 46, 23-37 (2004).
36. Long, J. Non-Foster Circuit Loaded Periodic Structures for Broadband Fast and Slow Wave Propagation. (University of California, San Diego, 2015).
37. Wang, H. et al. An Elegant Solution: An Alternative Ultra-Wideband Transceiver Based on Stepped-Frequency Continuous-Wave Operation and Compressive Sensing. IEEE Microw. Mag. 17, 53-63 (2016).
38. Chen, V. C., Tahmoush, D. & Miceli, W. J. Radar Micro-Doppler Signature Processing and applications. (2014).
39. Victor C. Chen, H. W. Micro-doppler effect in radar: phenomenon, model, and simulation study. IEEE Transactions on Aerospace and Electronic Systems
40. Kozlov, V., Filonov, D., Yankelevich, Y. & Ginzburg, P. Micro-Doppler frequency comb generation by rotating wire scatterers. J. Quant. Spectrosc. Radiat. Transf. 190, 7-12 (2017).

What is claimed is:

1. A cloaking system, comprising: a structure having a plurality of resonators characterized by a controllable resonance frequency, wherein said resonators are arranged to collectively ensure that variation of said resonance frequency over a predetermined range of resonance frequencies generates a phase shift between an electromagnetic wave incident on said structure and an electromagnetic wave scattered off said structure; and a controller configured for controlling said resonance frequency to provide a time-varying resonance frequency characterized by a temporal function which comprises a linear time-dependence; wherein said controller is configured to receive velocity data characterizing a motion of a vehicle and to select said time-varying resonance frequency based on said velocity data.

2. The system according to claim 1, being configured for a central frequency of said incident wave, wherein at least one of said resonators has a dispersive response to said incident wave, said dispersive response being selected to ensure that said phase shift range is effective for any frequency within a frequency band of at least 10% of said central frequency.

3. The system according to claim 1, wherein at least one of said resonators is configured to maintain, within a predetermined tolerance, equality between a frequency of said scattered wave and a frequency of said incident wave.

4. The system according to claim 1, wherein at least one of said resonators comprises an electronic element having a controllable impedance, wherein said controlling said resonance frequency comprises varying said impedance.

5. The system according to claim 1, wherein at least one of said resonators comprises an electric dipole defining an airgap, and an electronic element having a controllable impedance at said airgap.

6. The system according to claim 1, wherein at least one of said resonators comprises a magnetic dipole, and an electronic element having a controllable impedance.

7. The system according to claim 1, further comprising a metal screen and dielectric structure, between said resonators and said metal screen, wherein said resonators are mounted on said dielectric structure.

8. The system according to claim 1, wherein said phase shift is over a respective range of at least $1.57\pi$.

9. A vehicle, comprising:
a propulsion system carried by a vehicle body; and
the system according to claim 1, mounted on an external surface of said vehicle body.

10. A method of cloaking or deception a detection system transmitting an electromagnetic wave characterized by a central frequency, the method comprising:
scattering the detection system's wave off a structure having a plurality of resonators characterized by a controllable resonance frequency, wherein said resonators are arranged to collectively ensure that variation of said resonance frequency over a predetermined range of resonance frequencies generates a phase shift between the detection system's wave and an electromagnetic wave scattered off said structure; and
controlling said resonance frequency to provide a time-varying resonance frequency characterized by a temporal function;
wherein the method comprises receiving velocity data characterizing a motion of a vehicle and selecting said time-varying resonance frequency based on said velocity data.

11. The method according to claim 10, wherein at least one of said resonators has a dispersive response to the detection system's wave, said dispersive response being selected to ensure that said phase shift range is effective for any frequency within a frequency band of at least 10% of the central frequency.

12. The method according to claim 10, wherein at least one of said resonators is configured to maintain, within a predetermined tolerance, equality between a frequency of said scattered wave and a frequency of the incident wave.

13. The method according to claim 10, wherein at least one of said resonators comprises an electronic element having a controllable impedance, wherein said controlling said resonance frequency comprises varying said impedance.

14. The method according to claim 10, wherein said temporal function comprises a linear time-dependence.

15. The method according to claim 10, wherein at least one of said resonators comprises an electric dipole defining an airgap, and an electronic element having a controllable impedance at said airgap.

16. The method according to claim 10, wherein at least one of said resonators comprises a magnetic dipole, and an electronic element having a controllable impedance.

17. The method according to claim 10, wherein said resonators are mounted on a dielectric structure which is between a metal screen and said resonators.

* * * * *